United States Patent
Park et al.

(10) Patent No.: US 8,767,085 B2
(45) Date of Patent: *Jul. 1, 2014

(54) IMAGE PROCESSING METHODS AND APPARATUSES TO OBTAIN A NARROW DEPTH-OF-FIELD IMAGE

(75) Inventors: Jeong-yong Park, Changwon-si (KR); Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

This patent is subject to a terminal disclaimer.

(21) Appl. No.: 13/313,218

(22) Filed: Dec. 7, 2011

(65) Prior Publication Data

US 2012/0188394 A1    Jul. 26, 2012

(30) Foreign Application Priority Data

Jan. 21, 2011    (KR) .................. 10-2011-0006484

(51) Int. Cl.
*H04N 5/228*    (2006.01)

(52) U.S. Cl.
USPC .................................. 348/222.1; 348/208.1

(58) Field of Classification Search
USPC ........................... 348/222.1, 208.1
See application file for complete search history.

(56) References Cited

U.S. PATENT DOCUMENTS

| | | | |
|---|---|---|---|
| 2003/0228062 A1* | 12/2003 | Jeong | 382/237 |
| 2005/0157949 A1* | 7/2005 | Aiso et al. | 382/299 |
| 2005/0195317 A1* | 9/2005 | Myoga | 348/370 |
| 2007/0195343 A1* | 8/2007 | Yoneda | 358/1.9 |
| 2007/0291134 A1* | 12/2007 | Hwang et al. | 348/231.2 |
| 2008/0259176 A1* | 10/2008 | Tamaru | 348/222.1 |
| 2008/0316355 A1* | 12/2008 | Fukugawa et al. | 348/364 |
| 2009/0021600 A1* | 1/2009 | Watanabe | 348/222.1 |
| 2009/0040321 A1* | 2/2009 | Nakamura | 348/208.11 |
| 2009/0115858 A1* | 5/2009 | Lee | 348/208.4 |
| 2009/0167928 A1* | 7/2009 | Asukabe et al. | 348/345 |
| 2009/0174792 A1* | 7/2009 | Kusaka et al. | 348/230.1 |
| 2009/0179995 A1* | 7/2009 | Fukumoto et al. | 348/208.6 |
| 2009/0213239 A1* | 8/2009 | Yoshida | 348/222.1 |
| 2009/0284610 A1* | 11/2009 | Fukumoto et al. | 348/208.99 |
| 2010/0033602 A1* | 2/2010 | Okada et al. | 348/241 |
| 2010/0157107 A1* | 6/2010 | Iijima et al. | 348/240.99 |
| 2010/0165152 A1* | 7/2010 | Lim | 348/240.99 |
| 2011/0043655 A1* | 2/2011 | Park et al. | 348/222.1 |
| 2011/0116716 A1* | 5/2011 | Kwon et al. | 382/199 |
| 2011/0122266 A1* | 5/2011 | Jang | 348/208.6 |
| 2011/0187900 A1* | 8/2011 | Park et al. | 348/239 |
| 2011/0200257 A1* | 8/2011 | Oh et al. | 382/195 |
| 2012/0057070 A1* | 3/2012 | Park et al. | 348/345 |
| 2012/0105657 A1* | 5/2012 | Yokohata et al. | 348/208.4 |
| 2012/0287308 A1* | 11/2012 | Kojima et al. | 348/239 |

* cited by examiner

*Primary Examiner* — Nicholas Giles
*Assistant Examiner* — Abdelaaziz Tissire
(74) *Attorney, Agent, or Firm* — Drinker Biddle & Reath LLP

(57) ABSTRACT

Disclosed are example methods and apparatuses for image processing for improving an out-of-focus effect. A disclosed example methods includes capturing a first image, a second image, and a third image, which are captured with a different focus for a same subject and background; setting a subject portion and a background portion using the first and second images; combining the subject portion of first image and the background portion of the third image with each other to obtain an narrow depth-of-field (DOF) image; and performing image processing on the obtained narrow DOF image.

18 Claims, 17 Drawing Sheets

FIG. 9
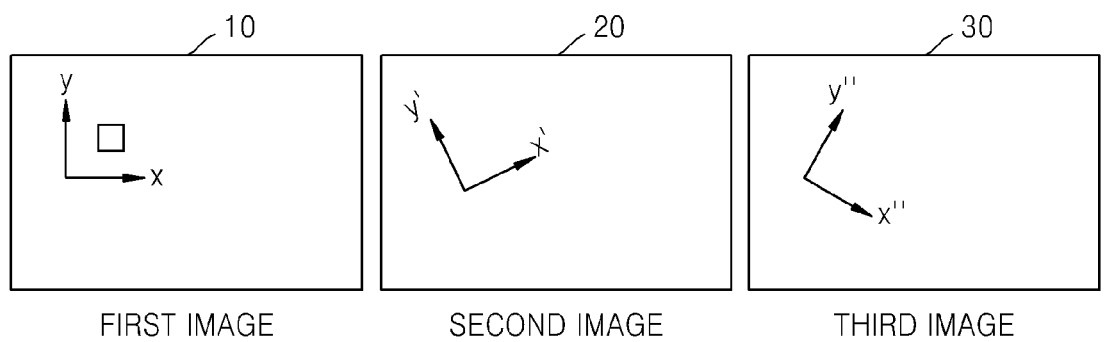
FIRST IMAGE  SECOND IMAGE  THIRD IMAGE
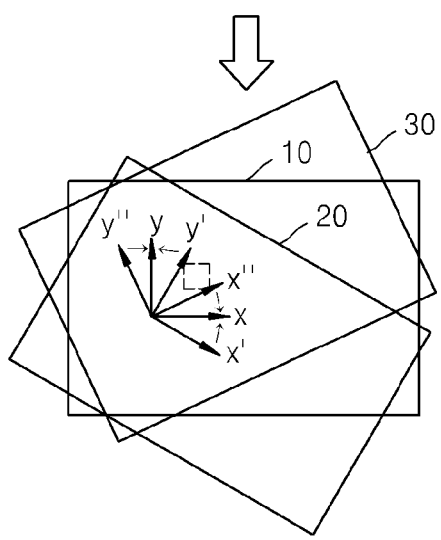

FIG. 13
BINARY-CODED IMAGE
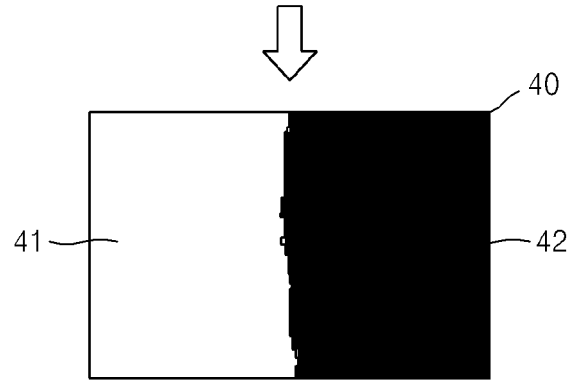
BINARY-CODED IMAGE
FIG. 14
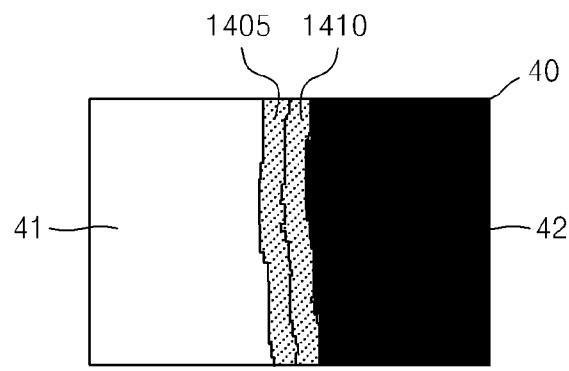
BINARY-CODED IMAGE

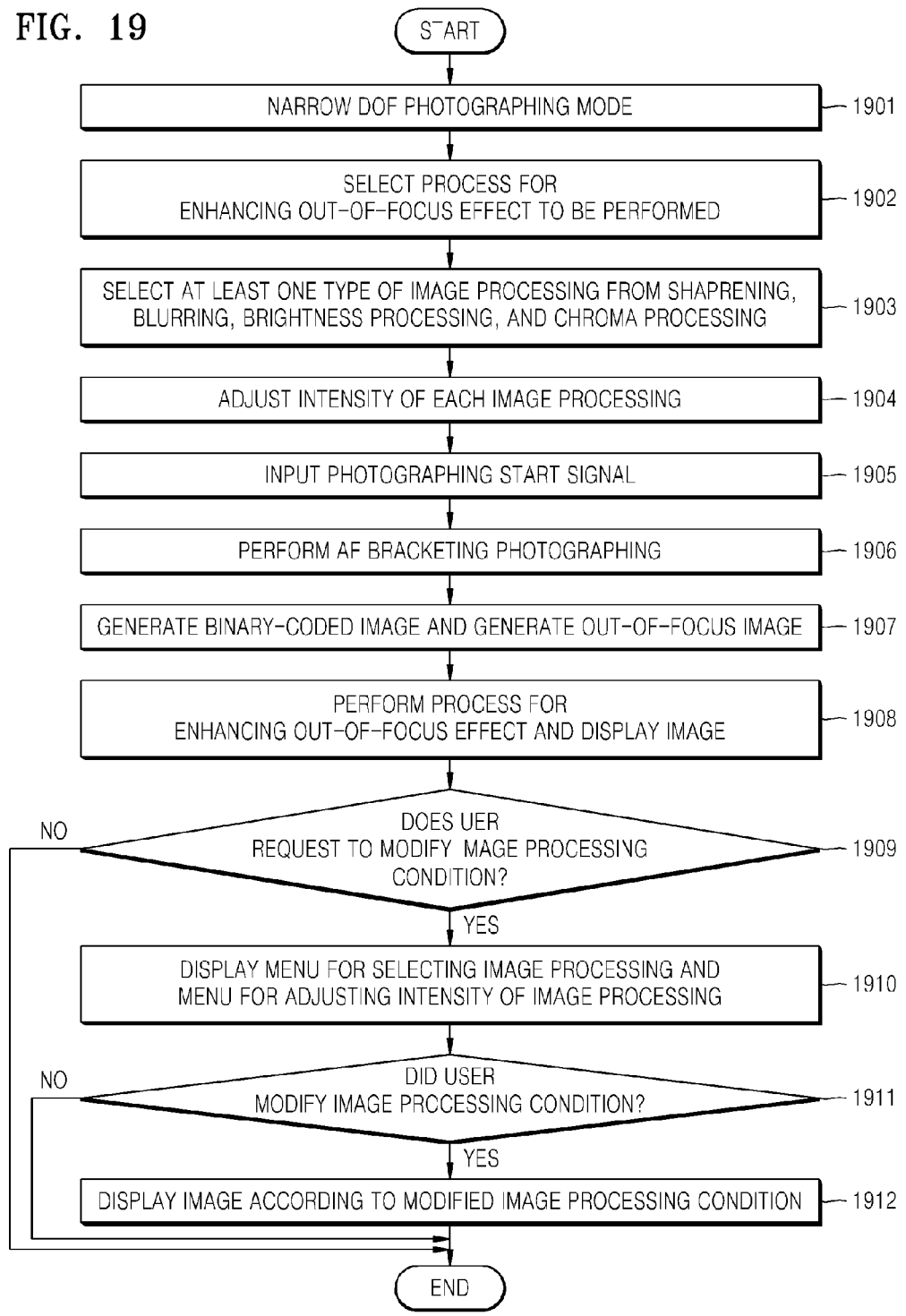

IMAGE PROCESSING METHODS AND APPARATUSES TO OBTAIN A NARROW DEPTH-OF-FIELD IMAGE

CROSS-REFERENCE TO RELATED PATENT APPLICATION

This application claims the priority benefit of Korean Patent Application No. 10-2011-0006484, filed on Jan. 21, 2011, in the Korean Intellectual Property Office, the entirety of which is incorporated herein by reference.

BACKGROUND

1. Field of the Invention

The invention relates to image processing and, more particularly, to methods and image processing apparatuses for enhancing an out-of-focus effect.

2. Description of the Related Art

A user may want to obtain narrow depth-of-field (DOF) images, in which a subject is in focus and the background is blurred, when taking pictures using a digital camera. Such images are referred to herein as having an "out-of-focus effect." In general, such images may be easily taken using a digital single lens reflex (DSLR) camera. However, since the imaging area of a compact digital camera is smaller due to the small and thin characteristics of the compact digital camera, a focal distance of a lens becomes shorter and the DOF becomes larger with respect to most subjects, and thus, it is more difficult to obtain images having an out-of-focus effect.

SUMMARY

One or more embodiments of the invention provide image processing methods and image processing apparatuses for improving (e.g., enhancing or increasing) an out-of-focus effect.

According to an aspect of the invention, there is provided an image processing method, the method comprising: capturing a first image, a second image, and a third image, which are captured with a different focus for a same subject and background; setting a subject portion and a background portion using the first and second images; combining the subject portion of the first image and the background portion of the third image with each other to obtain a narrow DOF image; and performing image processing on the obtained narrow DOF image.

The performing of the image processing may comprise performing at least one of sharpening the subject portion, blurring the background portion, adjusting brightness with respect to the subject portion, or adjusting chroma with respect to the subject portion.

The method may further comprise setting the type and intensity of the image processing.

The method may further comprise: displaying the narrow DOF image on which the image processing is to be performed; resetting at least one the sharpening the subject portion, the blurring the background portion, the adjusting the brightness with respect to the subject portion, or the adjusting the chroma with respect to the subject portion, and the intensity of the reset image processing, according to a selection of a user; and displaying a version of the narrow DOF image that is processed, according to the resetting.

The first through third images may be successively obtained when a single photographing start signal is received, and the first image is an image in which the subject is focused, the second image is an image in which the background is focused, and the third image is a super-macro image that is not focused, and the first image is the initially obtained image.

The method may further comprise: compensating for global motions in the second image and the third image based on the first image.

The setting of the subject portion and the background portion may comprise: generating a first difference of Gaussian (DoG) image and a second DoG image by applying a DoG filter to each of the first and second images; comparing radio-frequency components in mask regions of the first and second DoG images with each other, wherein the mask regions respectively include reference pixels that are located at corresponding positions of the first and second DoG images; if, as a result of the comparing, it is determined that radio-frequency components of the first DoG image are greater than those of the second DoG image, the reference pixels are represented as a first brightness value, and if it is determined that radio components of the second DoG image are greater than those of the first DoG image, the reference pixels are represented as a second brightness value, to derive a single binary-coded image; and correcting error pixels included in the derived binary-coded image.

Pixels represented as the first brightness value may be the subject portion and pixels represented as the second brightness value may be the background portion, and the method may further comprise correcting a boundary between the subject portion and the background portion in the binary-coded image.

The correcting of the error pixels may comprise: dividing the binary-coded image into a plurality of blocks; and when there are more pixels of the first brightness value than pixels of the second brightness value in a block, changing the brightness value of the pixels of the second brightness value to the first brightness value, and when there are more pixels of the second brightness value than pixels of the first brightness value in the block, changing the brightness value of the pixels of the first brightness value to the second brightness value.

The correcting of the boundary between the subject portion and the background portion may comprise: designating the boundary between the subject portion and the background portion and a peripheral portion as an unknown region; reducing the binary-coded image and the first image by the same reduction ratio; determining whether a pixel included in the unknown region corresponds to the subject portion or the background portion using image information of the pixel included in the first image at a corresponding position to the pixel of the unknown region; and changing the pixel in the unknown region to the first brightness value when the pixel corresponds to the subject portion, and changing the pixel in the unknown region to the second brightness value when the pixel corresponds to the background portion as a result of the determining.

The generating of the narrow DOF image may comprise: substituting the subject portion of the binary-coded image with the corresponding pixels of the first image; substituting the background portion of the binary-coded image with the corresponding pixels of the third image; and alpha-blending the boundary between the subject portion and the background portion.

According to another aspect of the invention, there is provided an image processing method for obtaining a narrow DOF image using a plurality of images, the method comprising: capturing a first image, a second image, and a third image, which are captured with a different focus for a same subject and background; setting a subject portion and a background portion using the first and second images; performing image processing on the subject portion or the background portion to improve an out-of-focus image effect; combining the subject portion of the first image and the background portion of the third image with each other to obtain a narrow DOF image.

According to another aspect of the invention, there is provided an image processing apparatus comprising: a photographing controller for controlling the apparatus to capture a first image, a second image, and a third image, which are captured with a different focus for a same subject and background; a setting unit for setting a subject portion and a background portion using the first and second images; a narrow DOF image derivation unit for combining the subject portion of the first image and the background portion of the third image to generate a narrow DOF image; and an image processing unit for performing image processing on the narrow DOF image.

The image processing unit may perform at least one of sharpening the subject portion, blurring the background portion, adjusting brightness with respect to the subject portion, or adjusting chroma with respect to the subject portion.

The photographing controller may control the apparatus to capture the first through third images successively when a single photographing start signal is received, and the first image is an image in which the subject is focused, the second image is an image in which the background is focused, and the third image is a super-macro image that is not focused, and the first image is the initially obtained image.

The apparatus may further comprise a global motion compensator that compensates for global motion in the second and third images based on the first image, and the setting unit may comprise: a DoG image generator for generating a first DoG image and a second DoG image by applying a DoG filter to each of the first and second images; a comparator for comparing radio-frequency components in mask regions of the first and second DoG images, which respectively include reference pixels that are located at positions corresponding to each other; a binary-coded image generator for generating a binary-coded image by representing the reference pixels as a first brightness value when the radio-frequency component of the first DoG image is greater than that of the second DoG image, and representing the reference pixels as a second brightness value when the radio-frequency component of the second DoG image is greater than that of the first DoG image; and a first corrector correcting error pixels included in the binary-coded image, wherein the first corrector comprises: a division unit for dividing the binary-coded image into a plurality of blocks; and an error corrector for changing the brightness value of the pixels of the second brightness value to the first brightness value, when there are more pixels of the first brightness value than pixels of the second brightness value in the block, and for changing the brightness value of the pixels of the first brightness value to the second brightness value when there are more pixels of the second brightness value than pixels of the first brightness value in the block.

A pixel represented as the first brightness value may be the subject portion and a pixel represented as the second brightness value may be the background portion, and the apparatus may further comprise a second corrector for correcting a boundary between the subject portion and the background portion in the binary-coded image.

The second corrector may comprise: an unknown region setting unit for designating the boundary between the subject portion and the background portion and a peripheral portion as an unknown region; and a boundary corrector for reducing the unknown region by comparing the binary-coded image with the first image, and clarifying the boundary.

The boundary corrector may comprise: an image reduction unit for reducing the binary-coded image and the first image by the same reduction ratio; a determiner for determining whether a pixel included in the unknown region corresponds to the subject portion or the background portion using image information of the pixel included in the first image at the corresponding position to the pixel of the unknown region; and a converter for changing the pixel in the unknown region to the first brightness value when the pixel corresponds to the subject portion, and changing the pixel in the unknown region to the second brightness value when the pixel corresponds to the background portion, as a result of the determining.

The out-of-focus image derivation unit may substitute the subject portion of the binary-coded image with corresponding pixels of the first image, and substitute a background portion of the binary-coded image with corresponding pixels of the third image, and perform an alpha-blending process on a boundary between the subject portion and the background portion.

BRIEF DESCRIPTION OF THE DRAWINGS

The above and other features and advantages of the invention will become more apparent by describing in detail exemplary embodiments thereof with reference to the attached drawings in which:

FIG. 9 is a diagram showing global motion compensation processes, according to an embodiment of the invention;

FIG. 13 is a diagram illustrating a process of compensating for an error pixel, according to an embodiment of the invention;

FIG. 14 is a diagram illustrating a process of setting an unknown region, according to an embodiment of the invention;

FIG. 19 is a flowchart illustrating an image processing method, according to another embodiment of the invention.

DETAILED DESCRIPTION

Figure 1:
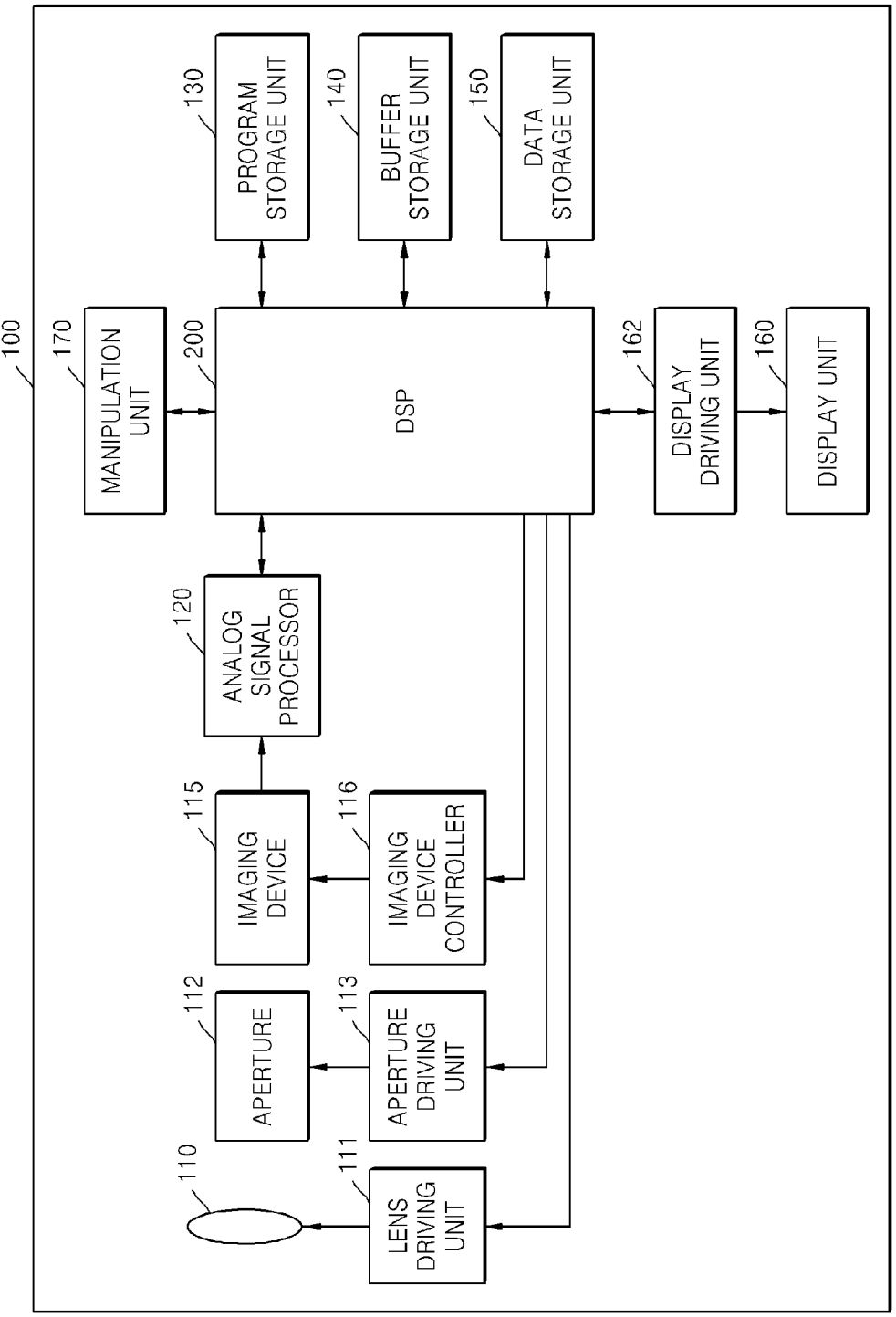
FIG. 1 is a block diagram illustrating a construction of a digital camera as an example of a digital photographing apparatus, according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the invention will be described below in more detail with reference to the accompanying drawings. Those components that are the same or are in correspondence are designated with the same reference numeral regardless of the figure number, and redundant explanations are omitted.

FIG. 1 is a block diagram of a digital camera 100 as an example of a digital image processing apparatus, according to an embodiment of the invention.

Referring to FIG. 1, the digital camera 100 includes a lens unit 110, a lens driving unit 111, an aperture 112, an aperture driving unit 113, an imaging device 115, an imaging device controller 116, an analog signal processor 120, a program storage unit 130, a buffer storage unit 140, a data storage unit 150, a display driving unit 162, a display unit 160, a digital signal processor (DSP)/central processing unit (CPU) 200, and a manipulation unit 170. Here, the lens unit 110, the lens driving unit 111, the aperture 112, the aperture driving unit 113, the imaging device 115, the imaging device controller 116, and the analog signal processor 120 may be referred to collectively as a photographing unit.

The lens unit 110 condenses an optical signal. The lens unit 110 includes a zoom lens controlling a viewing angle to be reduced or increased, according to a focal length, and a focusing lens for focusing onto a subject. These lenses may be formed of a respective single lens or a group of a plurality of lenses.

The aperture 112 opens or closes, according to a driving signal from the aperture driving unit 113 in order to adjust intensity of incident light.

The lens driving unit 111 and the aperture driving unit 113 respectively receive a control signal from the digital signal processor 200 to drive the lens unit 110 and the aperture 112. The lens driving unit 111 adjusts the focal length by adjusting a location of the focusing lens, and performs operations such as auto-focusing (AF), zooming, and focus changing. The aperture driving unit 113 adjusts the opening/closing of the aperture 112, and in particular, adjusts an f-number (aperture value) in order to perform operations such as the AF, automatic exposure correction, focus changing, and DOF changing.

An optical signal passing through the lens unit 110 and the aperture 112 forms an image of a subject on a light receiving surface of the imaging device 115. A charge coupled device (CCD), a complementary metal oxide semiconductor image sensor (CIS), or a high-speed image sensor may be used as the imaging device 115. A sensitivity of the imaging device 115 may be adjusted by the imaging device controller 116. The imaging device controller 116 may control the imaging device 115 according to a control signal that is generated automatically, using an image signal input in real-time, or a control signal manually input by a user of the digital camera 100.

Exposure time of the imaging device 115 is controlled by a shutter (not shown). The shutter may be a mechanical shutter that controls incidence of light by moving a cover, or an electronic shutter that controls exposure by supplying electric signals to the imaging device 115.

The analog signal processor 120 performs operations such as a noise reduction process, gain adjustment, waveform shaping, and analog-digital conversion with respect to the analog signals supplied from the imaging device 115.

Control signals from outside, for example, from the user, may be input through the manipulation unit 170. The manipulation unit 170 may include a shutter-release button for inputting a shutter-release signal that exposes the imaging device 115 to the light to capture images, a power button for inputting a control signal for turning on/turning off the digital camera 100, a wide-angle zoom button and a telephoto-zoom button for increasing and reducing a viewing angle according to input, and various functional buttons for inputting characters, selecting mode such as a photographing mode or a reproducing mode, setting white balance, and selecting exposure settings. The manipulation unit 170 having various buttons is not limited thereto, and may be embodied by any means enabling a user to input data, for example, a keyboard, a touch pad, a touch screen, or a remote controller.

According to the current embodiment, the user may select to perform image processing for improving an out-of-focus effect through the manipulation unit 170, such as, sharpening the subject portion, adjusting the brightness of the subject portion, adjusting the chroma of the subject portion, or blurring the background portion. Also, the intensity of each image processing (i.e., the amount or extent of each image processing applied to an image) may be adjusted.

In addition, the digital camera 100 includes the program storage unit 130 that stores programs such as an operating system for driving the digital camera 100 and application systems, the buffer storage unit 140 for temporarily storing data required to perform calculations or resultant data, and the data storage unit 150 that stores image files including image signals and various information required by the above programs.

In addition, the digital camera 100 includes the display unit 160 that displays an operation status of the digital camera 100, and images or information regarding images captured by the digital camera 100. The display unit 160 may provide the user with visual and aural information. The display unit 160 may be formed of a liquid crystal display (LCD) panel or an organic light emitting display (OLED) panel in order to provide visual information. The display driving unit 162 provides the display unit 160 with a driving signal.

In addition, the digital camera 100 includes the DSP/CPU 200 that processes input image signals and controls components of the digital camera 100, according to the input image signals or external input signals. The DSP/CPU 200 may perform, on the image data, an image signal process for improving image quality such as gamma correction, color filter array interpolation, color matrix processing, color correction, and color enhancement. In addition, the DSP/CPU 200 may generate an image file by compressing the image data generated by performing an image signal process for improving image quality, or restore image data from the image file. The image data may be compressed in a reciprocal or non-reciprocal format. As an example of the compression format, the image data can be converted into Joint Photographing Experts Group (JPEG) format or JPEG 2000 format.

The compressed image data may be stored in the data storage unit 150. In addition, the DSP/CPU 200 may perform a coloring process, a blurring process, edge emphasizing, image analysis, image recognition, and image effect process. The image recognition process may include a face recognition process or a scene recognition process. The DSP/CPU 200 may perform, for example, brightness level adjustment, color correction, contrast adjustment, image division, generation of character images, and an image combining process.

In addition, the DSP/CPU 200 may generate a control signal for controlling AF, zoom changing, focus changing, and auto-exposure correction by executing a program stored in the program storage unit 130 or by adopting an additional module, and provides the generated control signal to the lens driving unit 111, the aperture driving unit 113, and the imaging device controller 116. In addition, the DSP/CPU 200 may perform overall control of operations of the components included in the digital camera 100, for example, the shutter or a flash.

Figure 2:
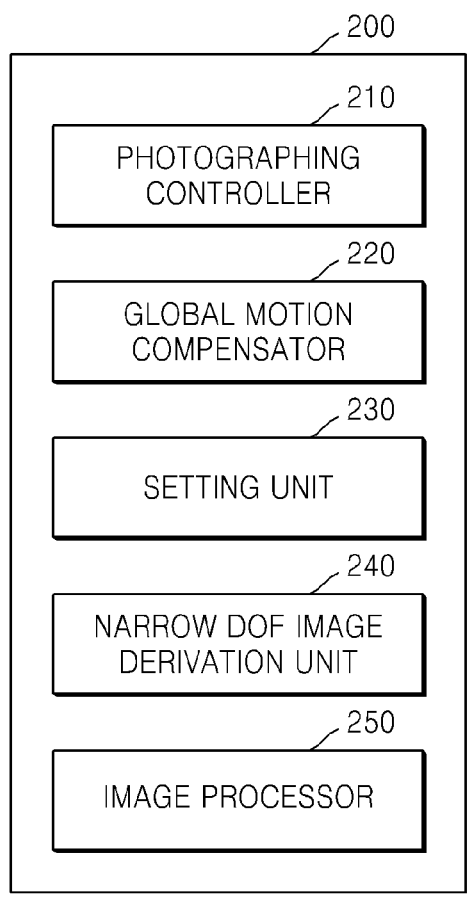
FIG. 2 is a detailed block diagram of a digital signal processor, according to an embodiment of the invention.

FIG. 2 is a detailed block diagram illustrating the DSP/CPU 200, according to an embodiment of the invention.

Referring to FIG. 2, the DSP/CPU 200 includes a photographing controller 210, a global motion compensator 220, a setting unit 230, a narrow DOF image derivation unit 240, and an image processor 250.

In response to a single photographing start signal, the photographing controller 210 may control the lens driving unit 111 and the aperture driving unit 113 so as to obtain a plurality of images with different focuses from each other with respect to the same subject and background. The plurality of images may include an image in which the subject is focused (hereinafter, a first image) 10, an image in which the background is focused (hereinafter, a second image) 20, and a super-macro image that is not focused (hereinafter, a third image) 30. The photographing controller 210 may obtain the first through third images 10, 20, and 30 successively, according to the single photographing start signal. In some examples, the first image 10 is initially obtained. On the other hand, the embodiments of the invention may be applied to a digital image processing apparatus including a plurality of photographing units. In the digital image processing apparatus including the plurality of photographing units, for example, a first photographing unit and a second photographing unit, the photographing controller 210 may control the photographing units to obtain two of the first through third images 10, 20, and 30 simultaneously, or the three images 10, 20 and 30 simultaneously. For example, the photographing controller 210 may control the first photographing unit to obtain the first image 10 and at the same time, control the second photographing unit to obtain the second image 20. Here, the third image 30 may be obtained by the first photographing unit or the second photographing unit, according to a selection of the user or an algorithm. In this case, a time for obtaining the plurality of images may be reduced, and the effect of a handshake that may occur while obtaining the images may be minimized or reduced.

The global motion compensator 220 compensates for global motions in the second image 20 and the third image 30, respectively, based on the first image 10. Herein, the term "global motion" denotes shifting of all of the pixels due to dislocation or motion of the digital camera 100 during photographing the second and third images 20 and 30 after photographing the first image 10. The global motion compensator 220 compensates for the shift of all the pixels to align the first through third images 10-30 to substantially correspond to each other.

Figure 12:
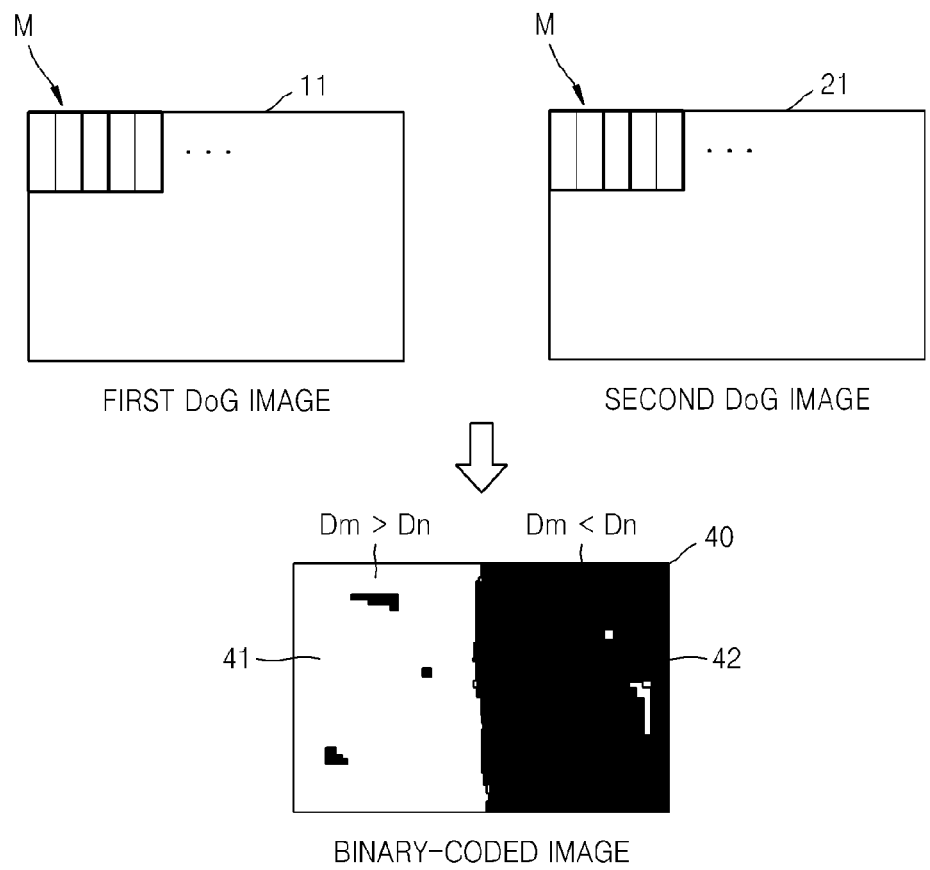
FIG. 12 is a diagram illustrating a process of generating a binary-coded image, according to an embodiment of the invention.

The setting unit 230 sets or selects a subject portion 12 and a background portion 22 using the first and second images 10 and 20 among the plurality of images to obtain a binary-coded image 40 (FIG. 12).

Figure 17:
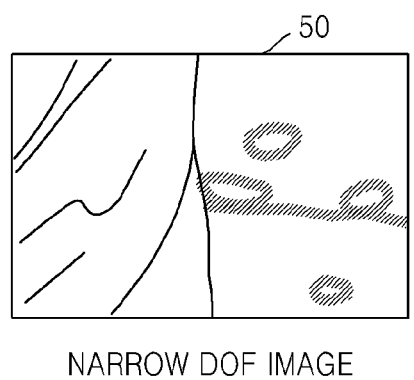
FIG. 17 shows a resultant image obtained by an image processing method, according to an embodiment of the invention.

The narrow DOF image derivation unit 240 combines the subject portion 12 of the first image 10, in which the subject images is focused, with the subject portion 41 of the binary-coded image 40, and combines the background portion 33 of the third image 30, that is, the super-macro image, with the background portion 42 of the binary-coded image 40 to derive an narrow DOF image 50 (FIG. 17). The narrow DOF image derivation unit 240 will be described in more detail later.

The image processor 250 performs image processing on a narrow DOF image 50 derived using the narrow DOF image derivation unit 240. Also, the image processor 250 may perform image processing on a binary-coded image set using the setting unit 230. That is, image processing may be performed on a subject portion 12 and on a background portion 22, which are generated through the first image 10 and the second image 20, and a narrow DOF image 50 may be derived with respect to the subject portion 12 and the background portion 22 on which the image processing is performed. Here, the image processing includes improving the out-of-focus effect, such as, sharpening the subject portion, adjusting the brightness of the subject portion, adjusting the chroma of the subject portion, and blurring the background portion.

Also, the image processing for improving the out-of-focus effect may be performed before or after capturing an image, according to the user's choice, and the user may also adjust the intensity of the image processing.

The image processing will be described in detail later with reference to FIG. 6.

Figure 3:
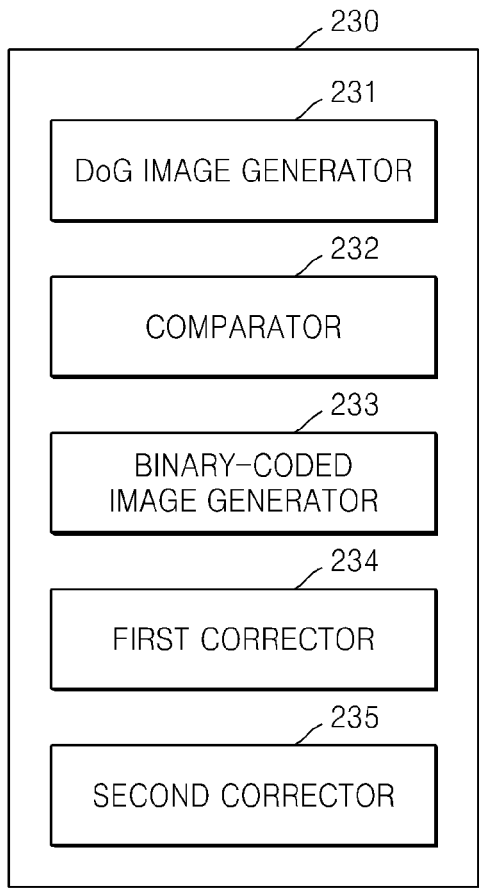
FIG. 3 is a detailed block diagram of a setting unit included in the digital signal processor shown in FIG. 2, according to an embodiment of the invention.

FIG. 3 is a detailed block diagram of the setting unit 230 included in the DSP/CPU 200 of FIG. 2, according to an embodiment of the invention.

Referring to FIG. 3, the setting unit 230 includes a difference of Gaussian (DoG) image generator 231, a comparator 232, a binary-coded image generator 233, a first corrector 234, and a second corrector 235.

The DoG image generator 231 applies a DoG filter to each of the first and second images 10 and 20 to generate a first DoG image 11 and a second DoG image 21, respectively. The DoG filter is a filter that forms a difference between two Gaussian filters having different sigma (σ) values. This may be represented by the mathematical expressions of Equations 1 through 3. Equation 1 denotes a first Gaussian filter having a first sigma value (σ1), and Equation 2 denotes a second Gaussian filter having a second sigma value (σ2). Here, the second sigma value σ2 is greater than the first sigma value σ1. When the first sigma value σ1 is greater than the second sigma value σ2, radio-frequency components may not be obtained in the DoG image. The DoG filter represents a difference between the first Gaussian filter and the second Gaussian filter as shown in Equation 3. Here, in Equations 1 through 3, x and y denote a coordinate of a pixel, and the first sigma value σ1 and the second sigma value σ2 are standard deviations representing a degree of smoothing of the respective Gaussian filter.

$$G_1 = \frac{1}{2\pi\sigma_1^2} e^{\frac{-(x^2+y^2)}{2\sigma_1^2}} \quad (1)$$

$$G_2 = \frac{1}{2\pi\sigma_2^2} e^{\frac{-(x^2+y^2)}{2\sigma_2^2}} \quad (2)$$

$$DoG(x, y) = $$
$$G_1(x, y) - G_2(x, y) = \left[\frac{1}{2\pi\sigma_1^2} e^{\frac{-(x^2+y^2)}{2\sigma_1^2}}\right] - \left[\frac{1}{2\pi\sigma_2^2} e^{\frac{-(x^2+y^2)}{2\sigma_2^2}}\right] \quad (3)$$

The first DoG image 11 and the second DoG image 21 generated by the DoG image generator 231 respectively represent radio-frequency components of the first and second images 10 and 20. Therefore, clarities of the first image 10 and the second image 20 may be compared by comparing magnitudes of the radio-frequency components in the first and second DoG images 11 and 21.

The comparator 232 compares magnitudes of the radio-frequency components in mask regions, which include reference pixels that are located at corresponding locations in the first DoG image 11 and the second DoG image 21. Here, a reference pixel may be a pixel designated by the user, or a pixel that is located at a center portion of the mask region. The mask region may refer to all pixels included in the mask when the mask is applied to first and second DoG images 11 and 21.

The binary-coded image generator 233 generates a single binary-coded image 40 by representing the reference pixel as a first brightness value when the radio-frequency component of the first DoG image 11 is greater than that of the second DoG image 21, and representing the reference pixel as a second brightness value when the radio-frequency component of the second DoG image 21 is greater than that of the first DoG image 11.

The first corrector 234 corrects an error pixel included in the generated binary-coded image 40, and the second corrector 235 corrects a boundary between the subject portion and the background portion included in the binary-coded image 40, in which the error pixel is corrected by the first corrector 234. In the binary-coded image 40, the subject portion is represented as the first brightness value, and the background portion may be represented as the second brightness value.

Figure 4:
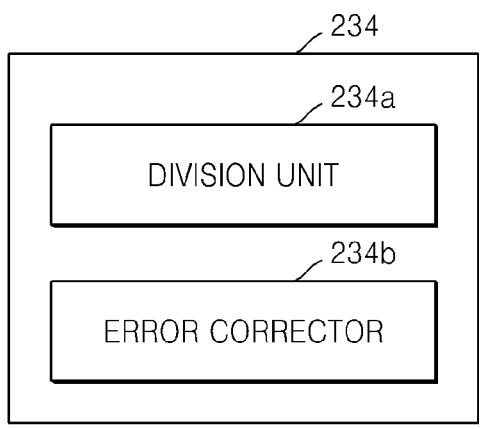
FIG. 4 is a detailed block diagram of a first correction unit included in the setting unit shown in FIG. 3, according to an embodiment of the invention.

FIG. 4 is a detailed block diagram of the first corrector 234 included in the setting unit 230 of FIG. 3, according to an embodiment of the invention.

Referring to FIG. 4, a division unit 234a divides the binary-coded image 40 into a plurality of blocks. In addition, an error corrector 234b changes brightness values of the pixels having the second brightness value to the first brightness value when there are a lot of pixels having the first brightness value in blocks divided by the division unit 234a, and changes the brightness values of the pixels having the first brightness value to the second brightness value when there are a lot of pixels having the second brightness value in the blocks. That is, the first corrector 234 corrects the error pixel with the result that the brightness value of an isolated pixel is converted into the brightness value of its neighboring pixels.

Figure 5:
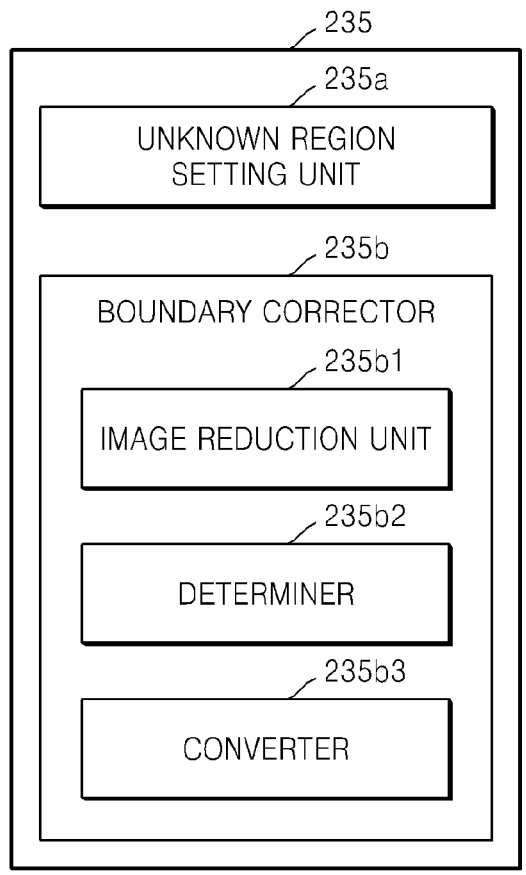
FIG. 5 is a detailed block diagram of a second correction unit included in the setting unit of FIG. 3, according to an embodiment of the invention.

FIG. 5 is a detailed block diagram of the second corrector 235 included in the setting unit 230 of FIG. 3, according to an embodiment of the invention.

Referring to FIG. 5, an unknown region setting unit 235a sets a boundary and peripheral region between the subject portion 41 and the background portion 42 in the binary-coded image 40 as an unknown region. Here, the boundary denotes an interface between the subject portion 41 and the background portion 42, and the peripheral region denotes some extension of the unknown region from the boundary toward the subject portion 41 and toward the background portion 42. A boundary corrector 235b gradually reduces the set unknown region by comparing the unknown region with the first image 10. In detail, the boundary corrector 235b includes an image reduction unit 235b1 that reduces the binary-coded image 40 and the first image 10 by the same ratio, a determiner 235b2 that determines whether the pixel included in the unknown region in the binary-coded image 40 corresponds to the subject portion 12 or the background portion 22, via the brightness value or color information of the pixel located at the same location in the first image 10, and a converter 235b3 that changes the brightness of the pixel to the first brightness value when the pixel included in the unknown region corresponds to the subject portion 12 and changes the brightness of the pixel to the second brightness value when the pixel included in the unknown region corresponds to the background portion 22.

Returning to FIG. 2, the narrow DOF image derivation unit 24 substitutes the subject portion 41, (i.e., pixels of the binary-coded image 40 which have the first brightness value) with the corresponding pixels in the first image 10, and substitutes the background portion 42 (pixels of the binary-coded image 40 which have the second brightness value) with the corresponding pixels in the third image 30. That is, the narrow DOF image derivation unit 24 replaces the subject portion 41 of the binary-coded image 40 with the subject portion 12 of the first image 10, and alpha-blends the background portion 42 of the binary-coded image 40 with the background portion 32 of the third image 30. Therefore, the binary-coded image 40 is combined with the other images so that the boundary between the subject portion 41 and the background portion 42 in the binary-coded image 40 may be naturally represented.

Figure 6:
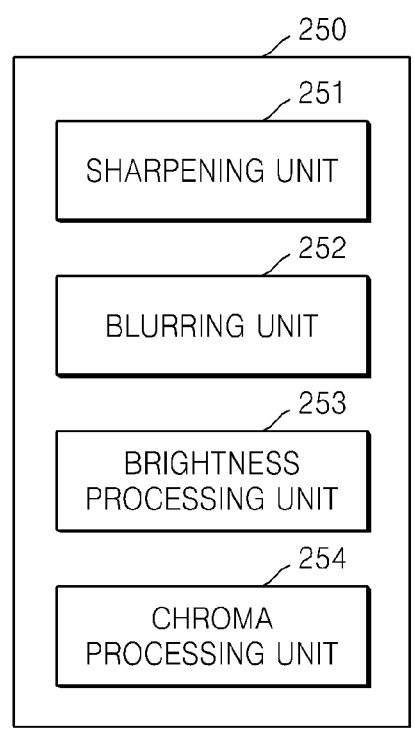
FIG. 6 is a detailed block diagram of the image processing unit 250 illustrated in FIG. 2, according to an embodiment of the invention.

FIG. 6 is a detailed block diagram illustrating the image processor 250 illustrated in FIG. 2, according to an embodiment of the invention.

The image processor 250 includes a sharpening unit 251, a blurring unit 252, a brightness processing unit 253, and a chroma processing unit 254.

Figure 20A:
FIGS. 20a-d, 21a-d and 22a-d show images for explaining a process for enhancing an out-of-focus effect, according to another embodiment of the invention.
Figure 20B:
Figure 20C:
Figure 20D:

The sharpening unit 251 further sharpens a portion of an image that is determined as a subject portion. Sharpening increases a color contrast of a pixel or increases a color contrast around a boundary line of the portion of the image to increase the sharpness of an image. FIG. 20a shows an original image, and FIGS. 20b through 20d show images which have been sharpened in order to increase the out of focus effect. The image of FIG. 20b is sharpened with a small intensity, the image of FIG. 20c is sharpened with an intermediate intensity, and the image of FIG. 20d is sharpened with a large intensity. The intensity of sharpness may be adjusted, according to the setup selected by the user, and the sharpening may be performed before or after capturing an image, according to the user's choice.

Figure 21A:
Figure 21B:
Figure 21C:
Figure 21D:

The blurring unit 252 further blurs a portion of an image that is determined as a background portion. By blurring the portion of the image, the background portion of the narrow DOF image may be further blurred. FIG. 21a shows an original image, and FIGS. 21b through 21d show images which have been blurred in order to increase the out-of-focus effect. The image of FIG. 21b is blurred with a small intensity, the image of FIG. 21c is blurred with an intermediate intensity, and the image of FIG. 21d is blurred with a large intensity. The intensity of blurring may be adjusted, according to the setup selected by the user, and the blurring may be performed before or after capturing an image, according to the user's choice.

Figure 22A:
Figure 22B:
Figure 22C:
Figure 22D:

The brightness processing unit 253 further increases the brightness of a portion of an image that is determined as a subject portion. By performing brightness processing, a subject portion of a narrow DOF image may be brightened. FIG. 22a shows an original image, and FIGS. 22b through 22d show images which have been brightened in order to increase the out-of-focus effect. The image of FIG. 22b is brightened with a small intensity, the image of FIG. 22c is brightened with an intermediate intensity, and the image of FIG. 22d is brightened with a large intensity. The intensity of brightening may be adjusted, according to the setup selected by the user, and the brightening may be performed before or after capturing an image, according to the user's choice.

The chroma adjusting unit 254 increases the chroma of a portion of an image that is determined as a subject portion so that the subject appears more conspicuous, thereby improving the out-of-focus effect.

Figure 7:
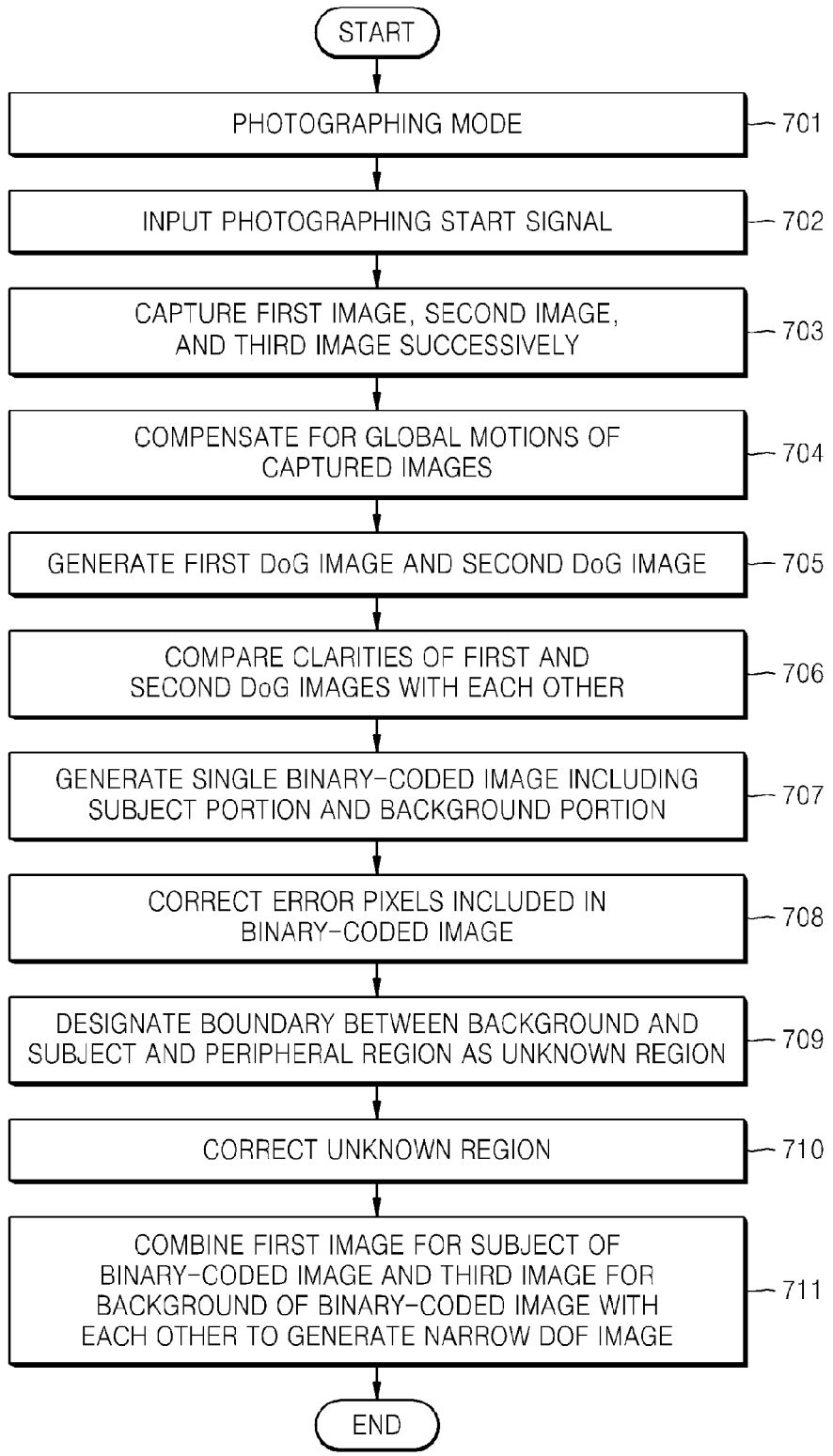
FIG. 7 is a flowchart illustrating an image processing method, according to an embodiment of the invention.

FIG. 7 is a flowchart illustrating an image processing method, according to an embodiment of the invention.

The user manipulates the digital camera 100 of FIG. 1 to enter a photographing mode in operation S701. In detail, a photographing mode may be a photographing mode for generating a narrow DOF image.

The user presses the shutter-release button of the manipulation unit 170 to input a photographing start signal into the DSP/CPU 200 in operation S702.

Figure 8:
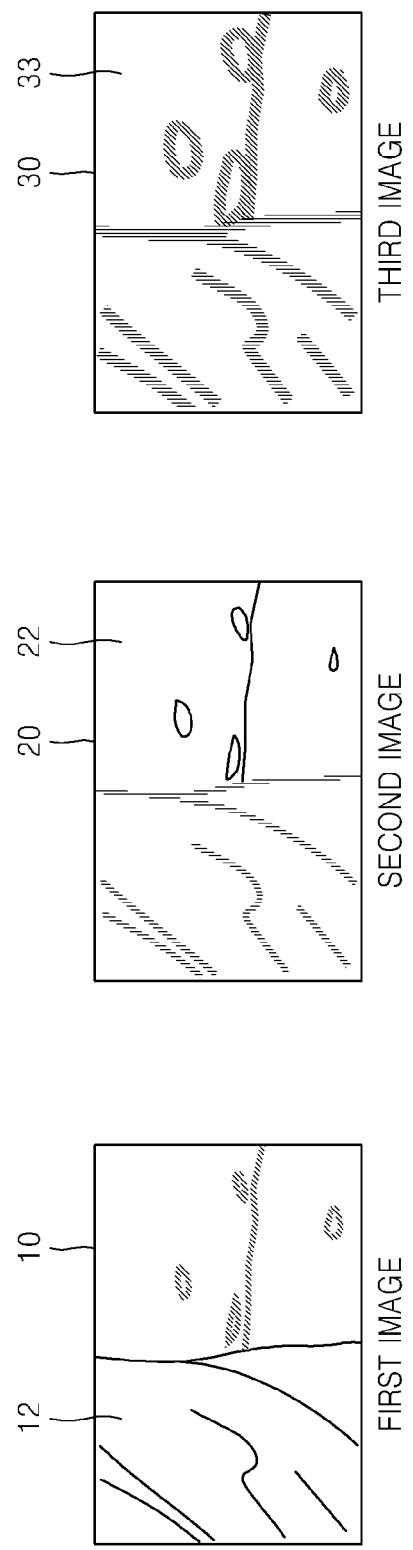
FIG. 8 shows a plurality of images having different focuses from each other, according to an embodiment of the invention.

The DSP/CPU 200 successively obtains a plurality of images with different focuses, according to the single photographing start signal in operation S703. FIG. 8 shows a plurality of images with different focuses from each other, according to the current embodiment of the invention. Referring to FIG. 8, the plurality of images may include the first image 10 in which the subject is focused, the second image 20 in which the background is focused, and the third image 30 that is a super-macro image that is not focused. Here, the first image 10 needs to be initially obtained so that the second and third images 20 and 30 may be successively captured to correspond to the first image 10 regardless of a photographing order. A narrow DOF image is an image in which the subject is focused and the background is blurred and, thus, other images should be obtained based on the first image 10, in which the subject is focused. In addition, because hand shake generally occurs less immediately after pushing the shutter-release button, the first image 10 should be captured initially in order to obtain the first image 100 with less hand shake.

The DSP/CPU 200 compensates for the global motion of each of the second and third images 20 and 30 based on the first image 10 in operation S704. FIG. 9 illustrates a process of compensating for the global motion of an image, according to the current embodiment of the invention. As shown in FIG. 9, shifting or rotating of all of the pixels of the second and third images 20 and 30 is compensated for based on the first image 10 and the first through third images 10, 20, and 30 are aligned so that the pixels in the first through third images 10, 20, and 30 substantially correspond to each other. Through the above process, the shifting or rotating of all of the pixels due to the hand shake occurring while the plurality of images are captured may be compensated. In addition, since the global motion is compensated, the pixels included in the plurality of images 10, 20 and 30 may substantially correspond to each other and, thus, one binary-coded image 40 or an narrow DOF image may be generated using the plurality of images 10, 20 and 30.

Figure 10:
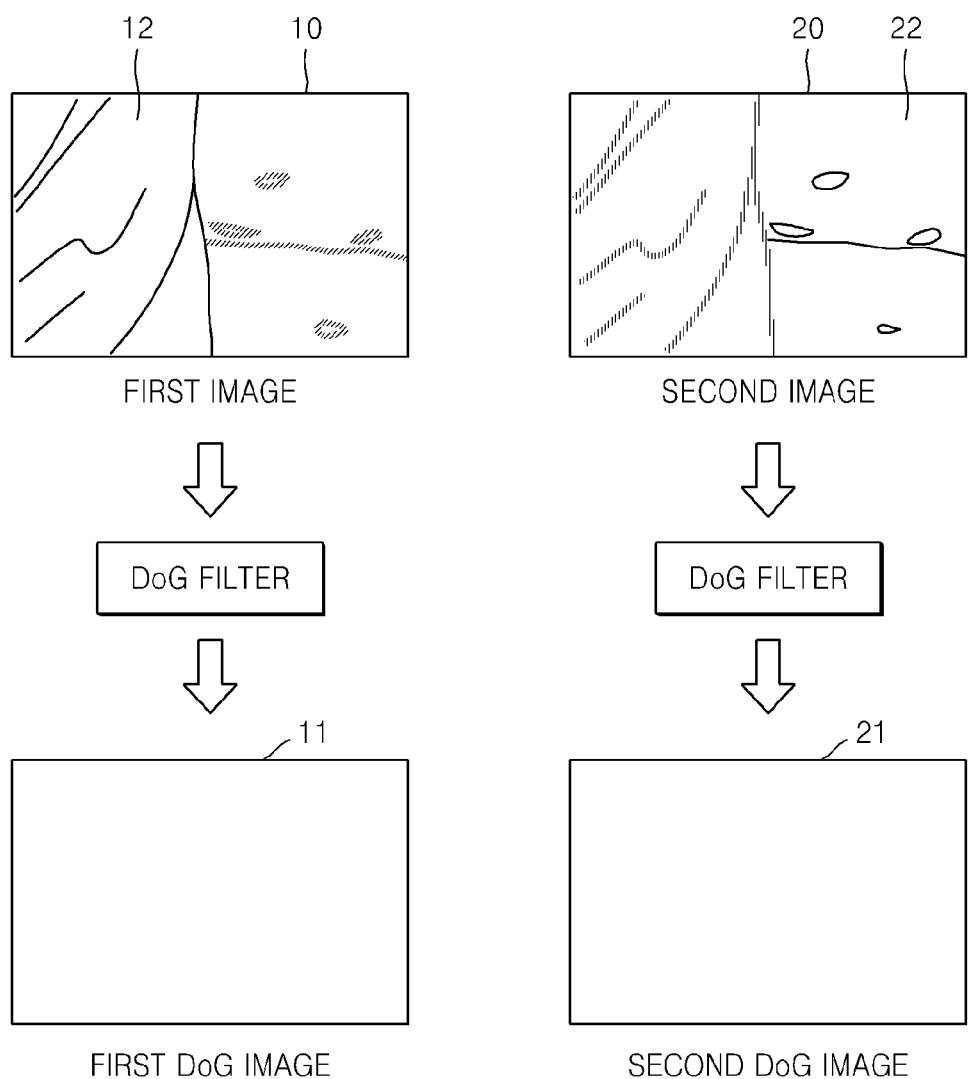
FIG. 10 shows processes of applying a difference of Gaussian (DoG) filter to images and obtaining results, according to an embodiment of the invention.

The DSP/CPU 200 generates the first DoG image 11 by applying the DoG filter to the global motion compensated first image 10, and generates the second DoG image 21 by applying the DoG filter to the global motion compensated second image 20 in operation S705. FIG. 10 illustrates processes of applying the DoG filter to the images and obtaining resultants, according to the current embodiment of the invention. As shown in FIG. 10, the first and second DoG images 11 and 21 may be obtained by extracting radio-frequency components of the first and second images 10 and 20 using the DoG filter. Since the DoG filter was described in detail with reference to FIG. 3, descriptions of examples and applications of the DoG filter is not repeated here.

Figure 11:
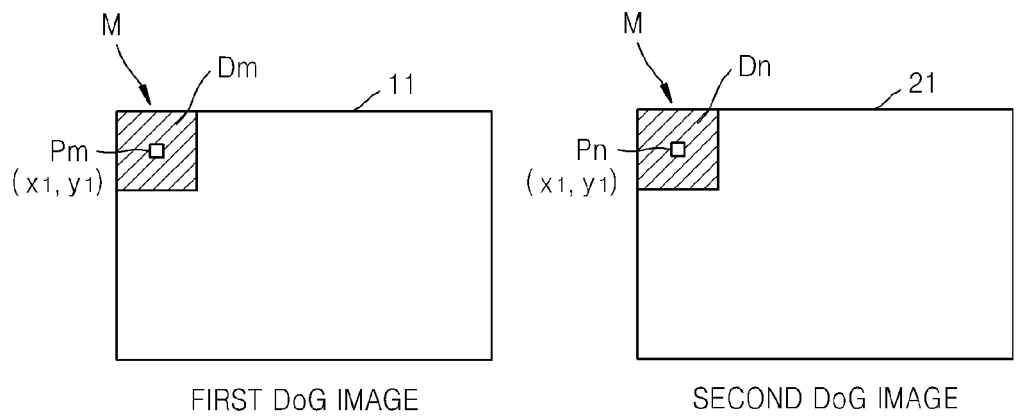
FIG. 11 illustrates a process of comparing radio-frequency components in a first DoG image and a second DoG image, according to an embodiment of the invention.

The DSP/CPU 200 compares the radio-frequency components of the first DoG image 11 and the second DoG image 21 with each other in operation S706. FIG. 11 illustrates a process of comparing the radio-frequency components of the first and second DoG images 11 and 21 with each other, according to the current embodiment of the invention. Referring to FIG. 11, an 11×11 mask M is applied to the first DoG image 11. A pixel located at a center portion of the mask M becomes a reference pixel Pm. Likewise, an 11×11 mask M is applied to the second DoG image 21. A pixel located at a center portion of the mask M is a reference pixel Pn. Here, the reference pixel Pm of the first DoG image 11 and the reference pixel Pn of the second DoG image 21 are located at corresponding positions, that is, a location $(x_1, y_1)$ in each of the first and second DoG images 11 and 21. The magnitudes of the radio-frequency components of 121 pixels including the reference pixel Pn or Pm in the mask region Dm or Dn of the first DoG image 11 or the second DoG image 21 are compared with each other. For example, a pixel $I_{max}$ having the highest brightness and a pixel $I_{min}$ having the lowest brightness are extracted from the each set of 121 pixels. Next, a difference Di between the brightnesses of the pixels $I_{max}$ and $I_{min}$ for a particular image 11 or 21 is calculated using Equation 4. If the difference Di between the brightness values in the first DoG image 11 is greater than that of the second DoG image 21, it is determined that the radio-frequency component of the first DoG image 11 is greater than that of the second DoG image 21. Likewise, if the difference Di between the brightness values in the second DoG image 21 is greater than that of the first DoG image 11, it is determined that the radio-frequency component of the second DoG image 21 is greater than that of the first DoG image 11.

$$D_i = I_{maxi} - I_{mini} \qquad (4)$$

In the current embodiment of the invention, the 11×11 mask M is used because accuracy of the result of Di is degraded when the mask is smaller than 11×11 and calculation speed is reduced when the mask is greater than 11×11. However, the size of the mask M is not limited thereto.

The DSP/CPU 200 generates the single binary-coded image 40 by comparing the radio-frequency components of the first and second DoG images 11 and 21 with each other in operation S707. FIG. 12 illustrates a process of generating the binary-coded image 40, according to the current embodiment of the invention. Referring to FIG. 12, when the radio-frequency component of the pixels included in the mask region Dm of the first DoG image 11 is greater than that of the second DoG image 21, the reference pixel Pm is represented as the first brightness value. In addition, when the radio-frequency component of the pixels included in the mask region Dn of the second DoG image 21 is greater than that of the first DoG image 11, the reference pixel Pn is represented as the second brightness value. As described above, the process of comparing the radio-frequency components of the first and second DoG images 11 and 21 with each other is repeated for each pixel of each of the first and second DoG images 11 and 21 while moving the 11×11 mask M one pixel at a time. As a result, the binary-coded image 40 represented by the first and second brightness values may be obtained. Here, the first brightness value may be 255 level (white) and the second brightness value may be 0 level (black). Parts represented by the first brightness value correspond to the subject portion 12 of the first image 10, in which the subject is focused, because the radio-frequency component of the first DoG image 11 is greater than that of the second DoG image 21 and the clarity of the first image 10 is greater than that of the second image 20. In addition, parts represented by the second brightness value correspond to the background portion 22 of the second image 20, in which the background is focused, because the radio-frequency component of the second DoG image 21 is greater than that of the first DoG image 11 and the clarity of the second image 20 is greater than that of the first image 10.

The DSP/CPU 200 corrects error pixels included in the binary-coded image 40 in operation S708. The error pixel is, for example, a pixel that most likely should be represented as the background portion but is represented as the subject portion, or a pixel that most likely should be represented as the subject portion but is represented as the background portion. FIG. 13 is a diagram illustrating a process of correcting the error pixel according the current embodiment of the invention. Referring to FIG. 13, the binary-coded image 40 is divided into a plurality of blocks B. For example, the size of the blocks B may be 32×32. If there are too many blocks B, it takes more time to correct error pixels, and if the number of blocks B is too small, the boundary between the subject portion and the background portion may become vague. When there are more pixels of the first brightness value than pixels of the second brightness value in a particular block B, the pixels of the second brightness value in that block B are changed to have the first brightness value. When there are more pixels of the second brightness value than pixels of the first brightness value in a particular block B, the pixels of the first brightness value in that block B are changed to have the second brightness value. That is, if there are more pixels of the first brightness value than those of the second brightness value in a block B, it is determined that the block is a part of the subject portion, and the brightness values of the isolated pixels, of the second brightness value, are corrected. Therefore, the binary-coded image 40 in which the error pixels are corrected may be obtained. However, while performing the above processes, at the boundary between the subject portion 41 and the background portion 42, a block B corresponding to the subject portion 41 may be undesirably converted to the background portion 42 or a block B corresponding to the background portion 42 may be undesirably converted to the subject portion 41. Thus, a process of correcting the boundary between the subject portion 41 and the background portion 42 to prevent the above problem is subsequently performed.

The DSP/CPU 200 sets the boundary between the subject portion 41 and the background portion 41 and the peripheral region of the boundary as the unknown region in the binary-coded image 40 in operation S709. FIG. 14 illustrates the process of setting the unknown region, according to the current embodiment of the invention. Referring to FIG. 14, the boundary 1405 between the subject portion 41 and the background portion 42 and the peripheral region 1410 in the binary-coded image 40 are set as the unknown region. The unknown region is converted to a third brightness value, which may be 150 level (gray).

Figure 15:
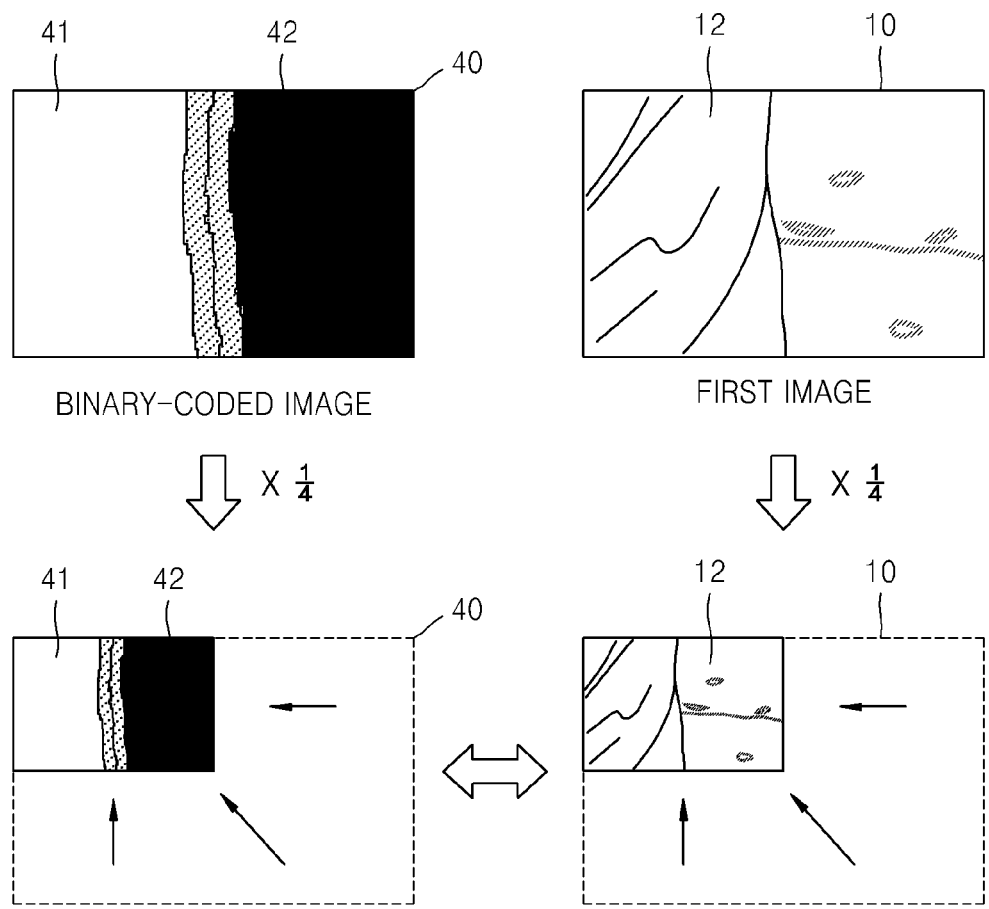
FIG. 15 is a diagram showing a process of reducing the unknown region of FIG. 14 and clarifying a boundary, according to an embodiment of the invention.

The DSP/CPU 200 corrects the unknown region included in the binary-coded image 40 by comparing the binary-coded image 40 with the first image 10 in order to clarify the boundary 1405 between the subject portion 41 and the background portion 42 in operation S710. FIG. 15 illustrates the process of reducing the unknown region and clarifying the boundary 1405 between the subject portion 41 and the background portion 422, according to the current embodiment of the invention. Referring to FIG. 15, the binary-coded image 40 and the first image 10 are reduced by the same ratio. Here, the binary-coded image 40 and the first image 10 may be respectively reduced by a factor of 4. It is determined whether a pixel included in the unknown region of the reduced binary-coded image 40 corresponds to the subject portion 41 or the background portion 42 using image information of the pixel included in the reduced first image 10 at the corresponding location as the pixel in the binary-coded image 40. As a result of determination, if the pixel included in the unknown region corresponds to the subject portion 41, the pixel is converted to have the first brightness value, and if the pixel included in the unknown region corresponds to the background portion 42, the pixel is converted to have the second brightness value. That is, each of the pixels in the unknown region is changed into the subject portion 41 or the background portion 42 by comparing the reduced binary-coded image with the reduced first image 10 so as to finally reduce and eliminate the unknown region. Here, the image information of the pixel included in the first image 10 may be the brightness value of the pixel or R (red), G (green), and B (blue) color information of the pixel. The above process of reducing the unknown region is repeatedly performed for the binary-coded image 40 and the first image 10 that are reduced by the factor of 4, the binary-coded image 40 and the first image 10 that reduce by a factor of 2, and the binary-coded image 40 and the first image 10 having their original sizes.

Figure 16:
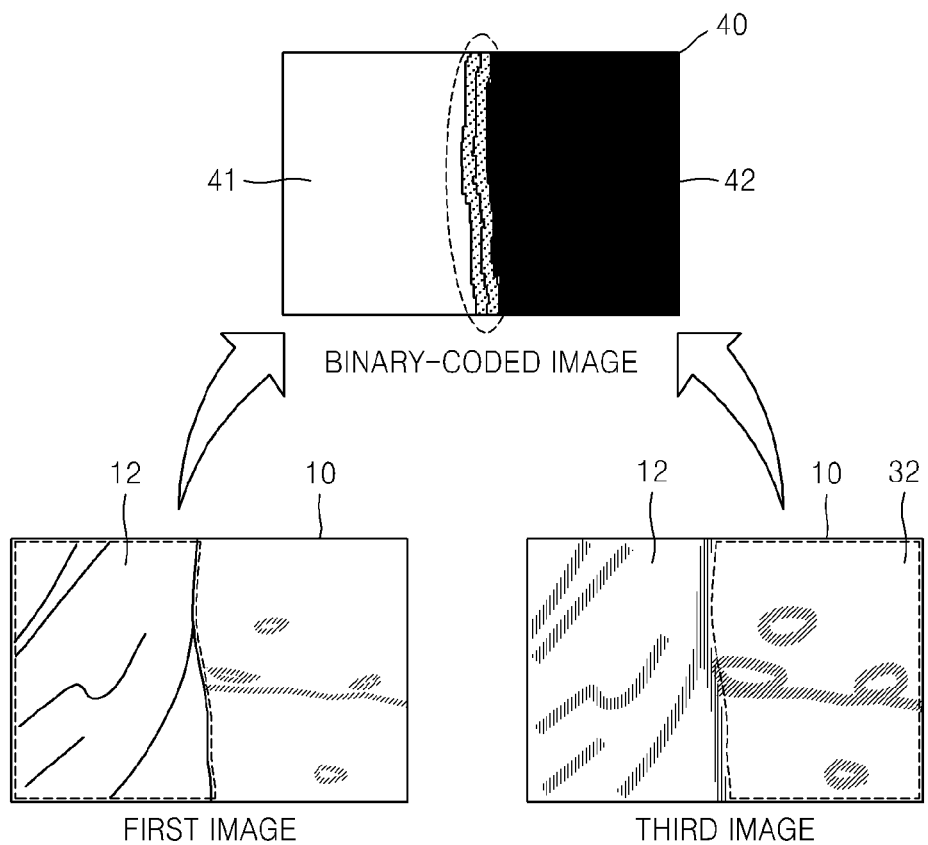
FIG. 16 is a diagram illustrating a process of generating a narrow DOF image, according to an embodiment of the invention.

The DSP/CPU 200 substitutes the subject portion 41 of the binary-coded image 40 with the corresponding subject portion 12 of the first image 10, and substitutes the background portion 42 of the binary-coded image 40 with the corresponding background portion 32 of the third image 30 to combine images and generate an narrow DOF image 50 in operation S711. FIG. 16 illustrates the process of generating the narrow DOF image, according to the current embodiment of the invention. Referring to FIG. 16, a first pixel of the first image 10 located at the same position as a second pixel included in the subject portion 41 of the binary-coded image 40 is substituted for the second pixel in the binary-coded image 40. In addition, a third pixel of the third image 30 located at the same position as a fourth pixel included in the background portion 42 of the binary-coded image 40 is substituted for the fourth pixel in the binary-coded image 40. That is, the subject portion 12 of the first image 10 and the background portion 32 of the third image 30 are combined to generate the narrow DOF image 50. The first image 10, in which the subject is focused, and the third image 30, which is the super-macro image that is not focused, are combined with each other, and thus, the narrow DOF image 50 desired by the user may be generated. According to the current embodiment of the invention, the images 10 and 30 may be combined so that the boundary between the background and the subject may be naturally represented by alpha-blending the binary-coded image 40. Here, the alpha blending is a combination method for naturally combining the images by representing the boundary as the intermediate brightness between the brightness levels of the subject portion and the background portion.

FIG. 17 shows a resultant image 50 obtained by the image processing method, according to an embodiment of the invention.

Referring to FIG. 17, according to the image processing method of the current embodiment of the invention, and narrow DOF image 50 in which the subject portion is clear and the background portion is blurred is obtained.

According to embodiments of the invention, owing to use of a plurality of images with different focuses obtained by AF bracketing photography, the image for the subject, in which the subject is focused, and the image for the background, which is not focused, are combined with each other to result in an image having the desired out-of-focus effect.

Therefore, according to the embodiments of the invention, narrow DOF images may be obtained using compact digital cameras, camera phones, personal digital assistants (PDAs), and personal multimedia players (PMPs) with photographing functions, which often have a deep DOF and, thus, are not generally capable of generating narrow DOF images.

Figure 18:
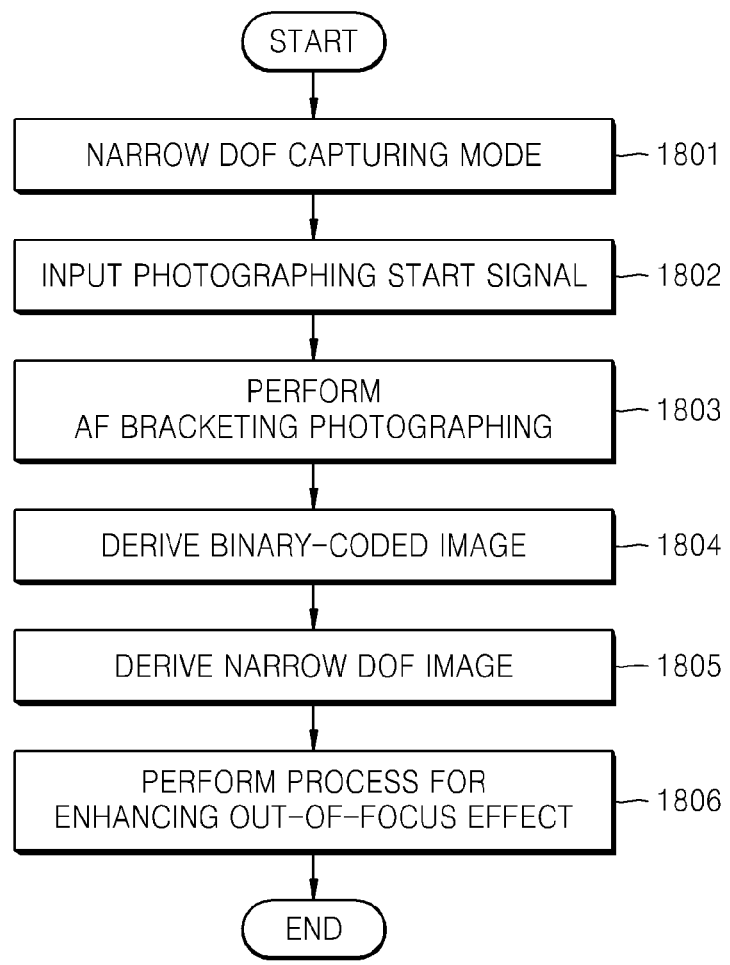
FIG. 18 is a flowchart illustrating an image processing method, according to another embodiment of the invention.

FIG. 18 is a flowchart illustrating an image processing method, according to another embodiment of the invention.

Referring to FIG. 18, in operation 1801, an out-of-focus mode is entered. According to a photographing starting signal input in operation 1802, AF bracketing photography is performed in operation 1803. Here, AF bracketing photography refers to photographing a plurality of images each having a different focus; in this case, a first image 10, in which a subject 12 is focused, a second image 20, in which a background 22 is focused, and a third image 40, which is a super-macro image that is not focused, are obtained by performing the AF bracketing photography.

In operation 1804, a binary-coded image 40 is generated. The binary-coded image 40 is generated using the first image 10 and the second image 20 obtained in operation 1803. The binary-coded image 40 may be generated using the process described above.

In operation 1805, a narrow DOF image 50 is generated. The subject portion 41 of the binary-coded image 40 is substituted with a corresponding portion 12 of the first image 10, and the background portion 42 is substituted with a corresponding portion 32 of the third image 30, to derive a narrow DOF image 50. The narrow DOF image 50 may be derived using the process described above.

In operation 1806, a process for improving an out-of-focus effect is performed. The process for improving an out-of-focus effect includes sharpening the subject portion, blurring the background portion, adjusting the brightness with respect to the subject portion, and adjusting the chroma with respect to the subject portion, and a combination of these processes. The process for improving an out-of-focus effect may be performed on the narrow DOF image 50 derived in operation 1806 or on the binary-coded image 40 derived in operation 1804.

Also, the process for improving an out-of-focus effect may be selected to be performed before or after photographing an image.

FIG. 19 is a flowchart illustrating an image processing method, according to another embodiment of the invention.

Referring to FIG. 19, an out-of-focus photography mode is selected in operation 1901, and a process for improving an out-of-focus effect is selected in operation 1902. In operation 1903, at least one of sharpening, blurring, brightness processing, and chroma processing is selected. In operation 1904, the intensity of each process is adjusted. Here, a menu of the types of processing and a menu of the intensity thereof is provided for the user to select. The processing intensity may be selected from one of intense, intermediate, and weak, but is not limited thereto.

In operations 1905 through 1907, an AF bracketing photography is performed, according to a photographing starting signal, and then a binary-coded image 40 and a narrow DOF image are generated.

In operation 1908, the narrow DOF image is processed, according to the selected type of image processing and the processing intensity selected in operations 1903 and 1904, and is displayed.

In operation 1909, if the user requests to modify an image processing condition, the same menus for selecting the type of image processing and adjusting the processing intensity as in operations 1903 and 1904 are displayed in operation 1910. If the user has modified the image processing condition, the image is processed, according to the modified image processing condition, and displayed in operation 1911.

Accordingly, if an out-of-focus effect is applied to an image, the image processing condition is selected to be performed before or after a photographing operation such that the out-of-focus effect is maximized or increased, thereby increasing convenience for the user.

According to the image processing apparatus of the embodiments of the invention, an image processing unit capable of obtaining a narrow DOF image and improving an out-of-focus effect at the same time is provided, thereby maximizing or increasing the out-of-focus effect.

Also, options for correcting an image with an out-of-focus effect, according to the selection of the user are provided, thereby increasing the satisfaction of the user.

The invention is described as being applicable to a digital image processing apparatus, but is not limited thereto. The invention may be applied to other digital appliances such as camera phones, personal digital assistants (PDAs), or portable multimedia players (PMPs) having a photographing function.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions.

For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. An image processing method, the method comprising:
   capturing a first image, a second image, and a third image, which are captured with a different focus for a same subject and background;
   setting a subject portion and a background portion using the first and second images:
   combining the subject portion of the first image and the background portion of the third image with each other to obtain an narrow depth-of-field (DOF) image;
   performing image processing on the obtained narrow DOF image;
   wherein the setting of the subject portion and the background portion comprises:
   generating a first difference of Gaussian (DoG) image and a second DoG image by applying a DoG filter to each of the first and second images;
   comparing radio-frequency components in mask regions of the first and second DoG images with each other, wherein the mask regions respectively include reference pixels that are located at corresponding positions of the first and second DoG images;
   if, as a result of the comparing, it is determined that radio-frequency components of the first DoG image are greater than those of the second DoG image, the reference pixels are represented as a first brightness value, and if it is determined that radio-components of the second DoG image are greater than those of the first DoG image, the reference pixels are represented as a second brightness value, to derive a single binary-coded image; and
   correcting error pixels included in the derived binary-coded image.

2. The method of claim 1, wherein the performing of the image processing comprises performing at least one of sharpening the subject portion, blurring the background portion, adjusting brightness with respect to the subject portion, or adjusting chroma with respect to the subject portion.

3. The method of claim 2, further comprising setting the type and intensity of the image processing.

4. The method of claim 2, further comprising:
   displaying the narrow DOF image on which the image processing is to be performed;
   resetting at least one the sharpening the subject portion, the blurring the background portion, the adjusting the brightness with respect to the subject portion, or the adjusting the chroma with respect to the subject portion, and the intensity of the reset image processing, according to a selection of a user; and displaying a version of the narrow DOF image that is processed, according to the resetting.

5. The method of claim 1, wherein the first through third images are successively obtained when a single photographing start signal is received, and the first image is an image in which the subject is focused, the second image is an image in which the background is focused, and the third image is a super-macro image that is not focused, and the first image is the initially obtained image.

6. The method of claim 5, further comprising:

compensating for global motions in the second image and the third image based on the first image.

7. The method of claim 1, wherein the correcting of the error pixels comprises:

dividing the binary-coded image into a plurality of blocks; and when there are more pixels of the first brightness value than pixels of the second brightness value in a block, changing the brightness value of the pixels of the second brightness value to the first brightness value, and when there are more pixels of the second brightness value than pixels of the first brightness value in the block, changing the brightness value of the pixels of the first brightness value to the second brightness value.

8. The method of claim 1, wherein pixels represented as the first brightness value correspond to the subject portion and pixels represented as the second brightness value correspond to the background portion, and the method further comprises correcting a boundary between the subject portion and the background portion in the binary-coded image.

9. The method of claim 8, wherein the correcting of the boundary between the subject portion and the background portion comprises:

designating the boundary between the subject portion and the background portion and a peripheral portion as an unknown region;

reducing the binary-coded image by a reduction ratio and reducing the first image by the same reduction ratio;

determining whether a pixel included in the unknown region corresponds to the subject portion or the background portion using image information of the pixel included in the first image at a corresponding position to the pixel of the unknown region; and changing the pixel in the unknown region to the first brightness value when the pixel corresponds to the subject portion, and changing the pixel in the unknown region to the second brightness value when the pixel corresponds to the background portion as a result of the determining.

10. An image processing method, the method comprising:

capturing a first image, a second image, and a third image, which are captured with a different focus for a same subject and background;

setting a subject portion and a background portion using the first and second images:

obtaining a narrow depth-of-field (DOF) image by performing steps comprising:

combining the subject portion of the first image and the background portion of the third image with each other to obtain an narrow depth-of-field (DOF) image;

substituting the subject portion of a binary-coded image with corresponding pixels of the first image;

substituting the background portion of the binary-coded image with corresponding pixels of the third image; and alpha-blending a boundary between the subject portion and the background portion;

performing image processing on the obtained narrow DOF image.

11. An image processing method for obtaining a narrow DOF image using a plurality of images, the method comprising:

capturing a first image, a second image, and a third image, which are captured with a different focus for a same subject and background;

setting a subject portion and a background portion using the first and second images;

performing image processing on the subject portion or the background portion to improve an out-of-focus image effect;

obtaining a narrow depth-of-field (DOF) image by performing steps comprising:

combining the subject portion of the first image and the background portion of the third image with each other;

substituting the subject portion of a binary-coded image with corresponding pixels of the first image; and substituting the background portion of the binary-coded image with corresponding pixels of the third image; and alpha-blending a boundary between the subject portion and the background portion.

12. An image processing apparatus comprising:

a photographing controller to control the apparatus to capture a first image, a second image, and a third image, which are captured with a different focus for a same subject and background;

a setting unit to set a subject portion and a background portion using the first and second images;

a narrow DOF image derivation unit to combine the subject portion of the first image and the background portion of the third image to generate a narrow DOF image;

an image processing unit to perform image processing on the narrow DOF image;

a global motion compensator to compensate for global motion in the second and third images based on the first image, and wherein the setting unit comprises:

a DoG image generator to generate a first DoG image and a second DoG image by applying a DoG filter to each of the first and second images;

a comparator to compare radio-frequency components in mask regions of the first and second DoG images, which respectively include reference pixels that are located at positions corresponding to each other;

a binary-coded image generator to generate a binary-coded image by representing the reference pixels as a first brightness value when the radio-frequency component of the first DoG image is greater than that of the second DoG image, and representing the reference pixels as a second brightness value when the radio-frequency component of the second DoG image is greater than that of the first DoG image; and a first corrector to correct error pixels included in the binary-coded image, wherein the first corrector comprises:

a division unit to divide the binary-coded image into a plurality of blocks; and an error corrector to change the brightness value of the pixels of the second brightness value to the first brightness value, when there are more pixels of the first brightness value than pixels of the second brightness value in the block, and to change the brightness value of the pixels of the first brightness value to the second brightness value when there are more pixels of the second brightness value than pixels of the first brightness value in the block, wherein the photographing controller is to control the apparatus to capture the first through third images successively when a single photographing start signal is received, and wherein the first image is an image in which the subject is focused, the second image is an image in which the background is focused, and the third image is a super-macro image that is not focused, and the first image is the initially obtained image.

13. The apparatus of claim 12, wherein the image processing unit is to perform at least one of sharpening the subject portion, blurring the background portion, adjusting brightness with respect to the subject portion, or adjusting chroma with respect to the subject portion.

14. The apparatus of claim 12, wherein the photographing controller is to control the apparatus to capture the first through third images successively when a single photographing start signal is received, and the first image is an image in which the subject is focused, the second image is an image in which the background is focused, and the third image is a super-macro image that is not focused, and the first image is the initially obtained image.

15. The apparatus of claim 12, wherein a pixel represented as the first brightness value is part of the subject portion and a pixel represented as the second brightness value is part of the background portion, and the apparatus further comprises a second corrector to correct a boundary between the subject portion and the background portion in the binary-coded image.

16. The apparatus of claim 15, wherein the second corrector comprises:

an unknown region setting unit to designate the boundary between the subject portion and the background portion and a peripheral portion as an unknown region; and a boundary corrector to reduce the unknown region by comparing the binary-coded image with the first image, and to clarify the boundary.

17. The apparatus of claim 16, wherein the boundary corrector comprises:

an image reduction unit to reduce the binary-coded image and the first image by the same reduction ratio;

a determiner to determine whether a pixel included in the unknown region corresponds to the subject portion or the background portion using image information of the pixel included in the first image at the corresponding position to the pixel of the unknown region; and a converter to change the pixel in the unknown region to the first brightness value when the pixel corresponds to the subject portion, and change the pixel in the unknown region to the second brightness value when the pixel corresponds to the background portion, as a result of the determining.

18. The apparatus of claim 12, wherein the narrow DOF image derivation unit is to substitute the subject portion of the binary-coded image with a corresponding portion of the first image, to substitute a background portion of the binary-coded image with a corresponding portion of the third image, and to perform an alpha-blending process on a boundary between the subject portion and the background portion.

* * * * *